United States Patent
Ookawara et al.

(10) Patent No.: US 9,639,229 B2
(45) Date of Patent: *May 2, 2017

(54) DISPLAY DEVICE WITH TOUCH PANEL

(71) Applicants: Japan Display Inc., Tokyo (JP); Panasonic Liquid Crystal Display Co., Ltd., Hyogo-ken (JP)

(72) Inventors: Takeshi Ookawara, Mabara (JP); Noriharu Matsudate, Kujukuri (JP)

(73) Assignees: Japan Display Inc., Tokyo (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/982,947

(22) Filed: Dec. 29, 2015

(65) Prior Publication Data

US 2016/0132160 A1 May 12, 2016

Related U.S. Application Data

(63) Continuation of application No. 14/451,769, filed on Aug. 5, 2014, now Pat. No. 9,250,758, which is a continuation of application No. 13/966,857, filed on Aug. 14, 2013, now Pat. No. 8,803,836, which is a continuation of application No. 12/649,414, filed on Dec. 30, 2009, now Pat. No. 8,519,969.

(30) Foreign Application Priority Data

Jan. 13, 2009 (JP) .................. 2009-004874

(51) Int. Cl.
G06F 3/045 (2006.01)
G06F 3/047 (2006.01)

(52) U.S. Cl.
CPC .............. *G06F 3/045* (2013.01); *G06F 3/047* (2013.01)

(58) Field of Classification Search
CPC .......... G06F 3/044; G06F 3/045; G06F 3/047; G06F 3/0412
USPC ............. 345/173–179; 349/12, 58, 153–156; 178/18.01–18.06
See application file for complete search history.

(56) References Cited

U.S. PATENT DOCUMENTS

| 6,078,274 A | 6/2000 | Inou |
| 6,552,718 B2 | 4/2003 | Ahn et al. |
| 6,738,117 B2 * | 5/2004 | Minakuchi .......... G02F 1/13338 349/118 |

(Continued)

FOREIGN PATENT DOCUMENTS

JP 2002-342014 A 11/2002

*Primary Examiner* — Prabodh M Dharia
(74) *Attorney, Agent, or Firm* — Typha IP LLC

(57) ABSTRACT

A display device with a touch panel includes the touch panel having a first substrate having a detection area to detect a coordinate and an outside area in which at least one external terminal is formed, a plurality of first lines to detect the coordinate in the detection area, a plurality of second lines to detect the coordinate in the detection area, wherein each of the plurality of first lines traverse each of the plurality of second lines. An organic emitting display panel is arranged under the touch panel, and a circular polarizing plate arranged at a side of the touch panel opposite to the organic emitting display panel. The organic emitting display panel, the touch panel, and the circular polarizing plate are arranged in this order.

11 Claims, 10 Drawing Sheets

(56) References Cited

U.S. PATENT DOCUMENTS

| | | | |
|---|---|---|---|
| 6,739,929 B2 * | 5/2004 | Furukawa | B32B 17/06 445/24 |
| 6,784,948 B2 * | 8/2004 | Kawashima | G02F 1/13338 178/18.05 |
| 6,814,452 B2 | 11/2004 | Kusuda | |
| 7,535,462 B2 | 5/2009 | Spath et al. | |
| 7,593,004 B2 | 9/2009 | Spath et al. | |
| 7,602,451 B2 * | 10/2009 | Hinata | G02F 1/1333 345/173 |
| 7,850,338 B1 | 12/2010 | Messina et al. | |
| 7,868,957 B2 | 1/2011 | Yamazaki et al. | |
| 7,906,216 B2 | 3/2011 | Yaegashi et al. | |
| 8,072,436 B2 | 12/2011 | Eriguchi et al. | |
| 8,125,466 B2 | 2/2012 | Hamm et al. | |
| 8,228,453 B2 | 7/2012 | Yamazaki et al. | |
| 8,890,833 B2 | 11/2014 | You | |
| 2001/0043291 A1 | 11/2001 | Kono et al. | |
| 2002/0033920 A1 * | 3/2002 | Sun | G02F 1/13338 349/139 |
| 2002/0036610 A1 | 3/2002 | Ito et al. | |
| 2002/0047969 A1 * | 4/2002 | Minakuchi | G02F 1/13338 349/117 |
| 2002/0175888 A1 | 11/2002 | Murade | |
| 2003/0090803 A1 | 5/2003 | Kusuda | |
| 2005/0046622 A1 * | 3/2005 | Nakanishi | G06F 3/0488 345/173 |
| 2005/0139398 A1 | 6/2005 | Endo | |
| 2005/0190338 A1 | 9/2005 | Lim | |
| 2005/0280635 A1 * | 12/2005 | Hinata | G02F 1/1333 345/173 |
| 2006/0013967 A1 * | 1/2006 | Mikoshiba | G02F 1/13338 428/1.1 |
| 2006/0033016 A1 | 2/2006 | Ogawa et al. | |
| 2006/0274047 A1 | 12/2006 | Spath et al. | |
| 2006/0274049 A1 | 12/2006 | Spath et al. | |
| 2007/0108032 A1 * | 5/2007 | Matsumoto | G06F 3/045 200/512 |
| 2007/0120471 A1 | 5/2007 | Yamazaki et al. | |
| 2007/0145892 A1 * | 6/2007 | Chen | H01L 51/5271 313/506 |
| 2007/0176868 A1 | 8/2007 | Lee et al. | |
| 2008/0030483 A1 | 2/2008 | Choo et al. | |
| 2008/0079856 A1 | 4/2008 | Fukui et al. | |
| 2008/0122804 A1 | 5/2008 | Kinoshita et al. | |
| 2008/0136788 A1 | 6/2008 | Nishikawa et al. | |
| 2008/0197778 A1 * | 8/2008 | Kubota | H01L 27/3258 315/73 |
| 2008/0266273 A1 | 10/2008 | Slobodin et al. | |
| 2008/0303798 A1 * | 12/2008 | Matsudate | G06F 3/0412 345/173 |
| 2009/0008142 A1 * | 1/2009 | Shimizu | B32B 5/18 174/261 |
| 2009/0046077 A1 | 2/2009 | Tanaka et al. | |
| 2009/0079464 A1 | 3/2009 | Yoshii | |
| 2009/0086318 A1 | 4/2009 | Yaegashi et al. | |
| 2009/0096763 A1 | 4/2009 | Hinata | |
| 2009/0096764 A1 | 4/2009 | You | |
| 2009/0128518 A1 | 5/2009 | Kinoshita et al. | |
| 2009/0143141 A1 | 6/2009 | Wells et al. | |
| 2009/0145654 A1 * | 6/2009 | Cha | H01J 11/12 174/350 |
| 2009/0146945 A1 * | 6/2009 | Cho | G06F 3/044 345/104 |
| 2009/0167721 A1 | 7/2009 | Hamm | |
| 2009/0219257 A1 * | 9/2009 | Frey | G06F 3/044 345/173 |
| 2009/0225050 A1 * | 9/2009 | Toyomaki | G02F 1/13338 345/173 |
| 2010/0033443 A1 | 2/2010 | Hashimoto | |
| 2010/0060593 A1 | 3/2010 | Krah | |
| 2010/0085322 A1 | 4/2010 | Mamba et al. | |
| 2010/0085326 A1 | 4/2010 | Anno | |
| 2010/0097344 A1 | 4/2010 | Verweg | |
| 2010/0214266 A1 | 8/2010 | Koshihara et al. | |
| 2011/0069036 A1 | 3/2011 | Anno | |
| 2011/0242028 A1 * | 10/2011 | Lee | G06F 3/0418 345/173 |
| 2012/0229390 A1 * | 9/2012 | Huang | G06F 3/0414 345/173 |
| 2014/0140020 A1 * | 5/2014 | Rogers | H01L 21/4867 361/749 |

* cited by examiner

DISPLAY DEVICE WITH TOUCH PANEL

CROSS-REFERENCE TO RELATED APPLICATION

This application is a continuation of U.S. application Ser. No. 14/451,769, filed on Aug. 5, 2014, which is a continuation of U.S. application of U.S. application Ser. No. 13/966,857, filed on Aug. 14, 2013, (now U.S. Pat. No. 8,803,836) which is a continuation application of U.S. Application Ser. No. 12/649,414, filed on Dec. 30, 2009, (now U.S. Pat. No. 8,519,969), the contents of which are incorporated herein by reference.

The present application claims priority form Japanese application JP 2009-004874 filed on Jan. 13, 2009, the entire contents of which are hereby incorporated by reference into this application.

BACKGROUND OF THE INVENTION

1. Field of the Invention

The present invention relates to a display device with a touch panel.

2. Background Art

As one of detection methods mainly adopted by a conventional display device with a touch panel, there has been known a detection method which detects a change of light and a detection method which detects a change of an electric characteristic. With respect to these detection methods, the detection method which detects a change of light has a drawback that detection accuracy is not stable.

On the other hand, as the detection method which detects a change of an electric characteristic, there has been known a resistance film method and a capacity method.

FIG. 20 shows a conventional capacity-type touch panel. A transparent electrode TLINE which covers the whole surface of a detection region is formed on an inner surface of a glass substrate GSUB. When a user touches a desired position of a touch panel from the outside of the glass substrate GSUB with his finger, capacity between the finger and the transparent electrode TLINE is detected so that coordinates on which the finger is placed is recognized.

FIG. 21 shows a conventional resistance-film-type panel. A transparent electrode TLINE which covers the whole surface of a detection region is formed on a glass substrate GSUB as a film on one side, a transparent electrode TLINE is formed on a resin RESIN having light transmitting property as a film on another side, and this film is adhered to the glass substrate GSUB such that the transparent electrode TLINE on the resin RESIN faces the transparent electrode TLINE on the glass substrate GSUB in an opposed manner. To prevent the short-circuiting between the respective transparent electrodes TLINE, the transparent spacers SPACERS are arranged in plane so as to hold a fixed distance (several to several tens μm).

Before the resistance-film-type touch panel shown in FIG. 21 is proposed, as described in JP-A-2002-342014 (patent document 1), there has been known a method in which a transparent electrode is formed into stripe-shaped electrodes and these stripe-shaped transparent electrodes are made intersect with each other thus arranging intersecting portions in a matrix array.

SUMMARY OF THE INVENTION

The method disclosed in patent document 1 uses the stripe-shaped transparent electrodes and hence, to increase the detection accuracy, it is inevitably necessary to decrease a line width of the stripe-shaped transparent electrode. However, the transparent electrode having a narrow line width exhibits a high resistance value and hence, this method cannot maintain desired detection accuracy. Further, when a thickness of the transparent electrode is increased, it is necessary to take a taper formed by etching into consideration and hence, it is difficult to decrease a gap between the transparent electrodes.

In view of the above-mentioned circumstances, the previously-mentioned resistance film method has been proposed. In this method, the transparent electrode has high resistance and hence, by making use of a potential difference of voltages applied to the transparent electrodes, input points, that is, contact positions of the upper and lower transparent electrodes are detected one-dimensionally, and such application of voltages and detection of potential difference are performed twice along an X axis and a Y axis so that two-dimensional coordinates are calculated.

However, the above-mentioned resistance film method has following drawbacks.

A: The driving principle of this method is based on the application of high resistance property of the transparent electrode made of metal oxide and hence, when the transparent electrode is formed of a low resistance film, a voltage drop becomes small so that the detection becomes impossible.

B: Since the transparent electrode has high resistance, large-sizing of the touch panel becomes difficult so that a size limit from a practical point of view is considered 17 inches (approximately 200 mm×300 mm).

C: To detect two or more input points, it is necessary to increase the detection frequency twice or more so that detection accuracy is lowered.

D: Patterning or forming of transparent electrodes are costly.

E: The transmissivity of the transparent electrode is limited to approximately 75% to 80% in view of a problem attributed to optical transmissivity of the transparent electrode.

F: A partial region of a touch panel touched in a concentrated manner in a usual inputting operation. Particularly, when a user performs inputting using a touch pen or with his finger, an external force is applied to input coordinates in a concentrated manner. Due to such an external force, the transparent electrode is bent using the input coordinates as the center and hence, a portion of the transparent electrode in the vicinity of the input coordinates is liable to be damaged.

G: Since the transparent electrode is made of metal oxide in general, the degradation of the transparent electrode which brings about the increase of resistance of the transparent electrode per se is inevitable thus giving rise to a drawback with respect to reliability in lifetime.

H: It is necessary to detect a voltage drop by analogue detection and hence, a detection circuit is costly.

I: Flexible cables which connect the transparent electrodes and the circuits are costly.

J: Electric current flows in the transparent electrode and hence, the resistance of the transparent electrode is increased.

K: The transparent electrode is not transparent and hence, coloring occurs whereby a color range of a display panel is displaced.

In view of such drawbacks, applicants of the present application proposed a touch panel which adopts the new detection structure (Japanese Patent Application 2007-

149884). However, according to such a related art, since a plurality of lines are formed on a touch panel and hence, when a user moves a pen on an operation surface in a sliding manner, the user feels the surface unevenness. To overcome this drawback, the inventors of the present invention have made extensive studies to improve such a touch panel and have made a touch panel display device which gives further excellent touch feeling to a user.

Accordingly, it is an object of the present invention to provide a display device with a touch panel which gives excellent touch feeling to a user.

(1) According to one aspect of the present invention, there is provided a display device with a touch panel which includes: a touch panel which includes a first substrate, a second substrate arranged to face the first substrate in an opposed manner with a gap formed therebetween, a first electrode which is constituted of a plurality of metal lines formed on a surface of the first substrate which faces the second substrate, and a second electrode formed on a surface of the second substrate which faces the first substrate; a display panel which is mounted on the second substrate on a side opposite to the first substrate; and a resin film which is adhered to the first substrate on a side opposite to the second substrate. According to the present invention, the resin film is adhered to the touch panel, the unevenness attributed to the first electrode is absorbed and hence, the touch panel can give a user excellent touch feeling.

(2) In the display device with a touch panel having the constitution (1), the display panel may be a liquid crystal display panel which excludes a polarizing plate, a first polarizing plate may be adhered to a surface of the display panel opposite to the second substrate, and the resin film may constitute a second polarizing plate.

(3) In the display device with a touch panel having the constitution (1), the resin film may constitute a circular polarizing plate.

(4) In the display device with a touch panel having any one of the constitutions (1) to (3), a cushion layer which is softer than the resin film may be further interposed between the resin film and the touch panel.

(5) In the display device with a touch panel having any one of the constitutions (1) to (3), an air cushion layer may be further interposed between the resin film and the touch panel.

(6) In the display device with a touch panel having any one of the constitutions (1) to (3), a cushion layer which is softer than the resin film may be further interposed between the display panel and the touch panel.

(7) In the display device with a touch panel having any one of the constitutions (1) to (3), an air cushion layer may be further interposed between the display panel and the touch panel.

DESCRIPTION OF THE PREFERRED EMBODIMENT

Hereinafter, an embodiment of the present invention is explained in conjunction with drawings.

Figure 1:
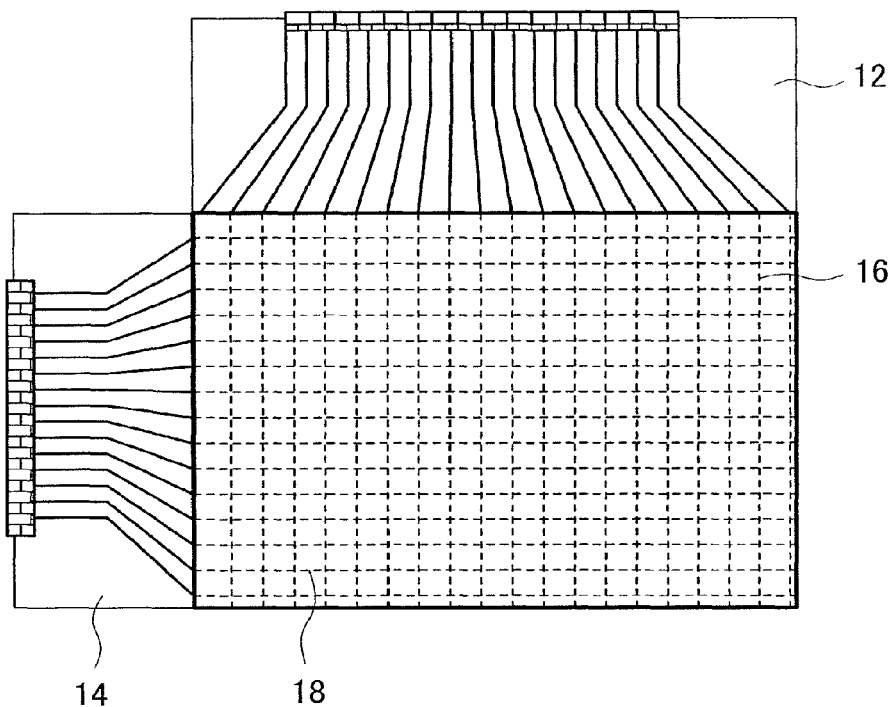
FIG. 1 is a plan view schematically showing a display device with a touch panel according to an embodiment of the present invention.
Figure 2:
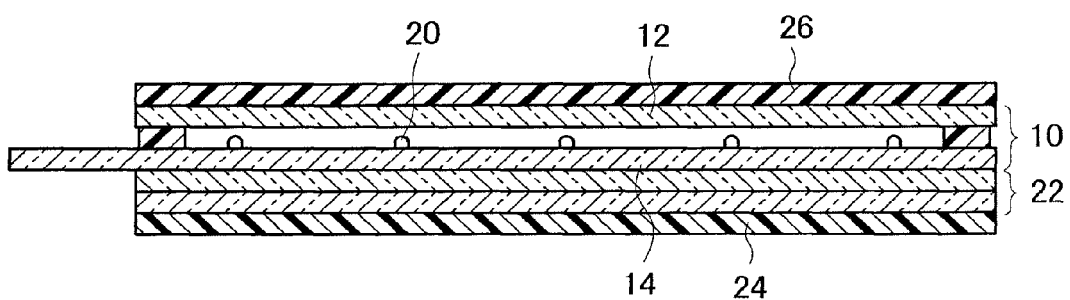
FIG. 2 is a cross-sectional view schematically showing the display device with a touch panel according to the embodiment of the present invention.

FIG. 1 is a plan view schematically showing a display device with a touch panel according to the embodiment of the present invention. FIG. 2 is a cross-sectional view schematically showing the display device with a touch panel according to the embodiment of the present invention.

The display device includes a touch panel (or referred to as "touch screen") 10. The touch panel 10 includes a first substrate 12, and a second substrate 14 which is arranged to face the first substrate 12 in an opposed manner with a gap formed therebetween. On a surface of the first substrate 12 which faces the second substrate 14 in an opposed manner, a first electrode 16 which is constituted of a plurality of metal lines is formed (omitted from FIG. 2). On a surface of the second substrate 14 which faces the first substrate 12 in an opposed manner, a second electrode 18 is formed (omitted from FIG. 2). The second electrode 18 is also constituted of a plurality of metal lines. Spacers 20 are arranged between the first substrate 12 and the second substrate 14 thus preventing the first electrode 16 and the second electrode 18 from coming into contact with each other. The spacers 20 can be formed by screen printing.

When a user touches an outer surface of the first substrate 12 with his finger or a pen, the first substrate 12 is recessed, and the first electrode 16 and the second electrode 18 are brought into contact and are electrically connected with each other. The detail of the touch panel 10 is described in the specification and drawings of Japanese Patent Application 2007-149884, and the content of the touch panel 10 is described later.

The display device with a touch panel includes a display panel 22. The display panel 22 shown in FIG. 2 is a liquid crystal display panel (excluding a polarizing plate) which is constituted of a pair of substrates with liquid crystal not shown in the drawing sandwiched therebetween. The display panel 22 is mounted on the second substrate 14 of the touch panel 10 on a side opposite to the first substrate 12. A first polarizing plate 24 is adhered to a surface of the display panel 22 on a side opposite to the second substrate 14.

A resin film 26 is adhered to the first substrate 12 on a side opposite to the second substrate 14. The resin film 26 constitutes a second polarizing plate (linear polarizing plate). That is, the liquid crystal display panel (excluding polarizing plate) which constitutes the display panel 22 is arranged between the first polarizing plate 24 and the resin film 26 which constitutes the second polarizing plate. During transmission of light through the touch panel 10, even when the birefringence of light is generated due to the first electrode 16 and the second electrode 18 so that the polarization surfaces of light are not aligned, the resin film 26 which constitutes the second polarizing plate is arranged outside the touch panel 10 and hence, it is possible to align the polarization surfaces after light passes through the touch panel 10 thus realizing the liquid crystal display through the resin film 26.

In the touch panel 10 according to this embodiment, the first electrode 16 is constituted of the plurality of metal lines. Accordingly, when a user touches the outer surface of the first substrate 12 with his finger or a pen in a sliding manner, due to convex portions formed by the first electrode 16 and the second electrode 18 and concave portions each of which is formed between neighboring metal lines, a user feels the unevenness of the outer surface. However, the resin film 26 is adhered to the touch panel 10 and hence, the unevenness attributed to the first electrode 16 (also attributed to the second electrode 18) can be absorbed whereby the user can enjoy excellent touch feeling.

Figure 3:
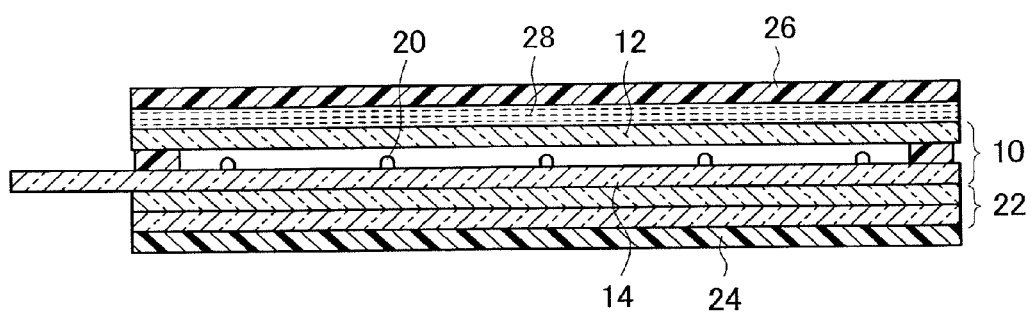
FIG. 3 is a cross-sectional view schematically showing a display device with a touch panel according to a modification 1 of the embodiment of the present invention.

FIG. 3 is a cross-sectional view schematically showing a display device with a touch panel according to a modification 1 of the embodiment of the present invention. In the modification 1, a cushion layer 28 is arranged between the resin film 26 and the touch panel 10 (first substrate 12). The cushion layer 28 is softer than the resin film 26, and is made of silicone, for example. The cushion layer 28 is transparent. According to the modification 1, the user can enjoy smoother writing feeling due to the provision of the cushion layer 28.

Figure 4:
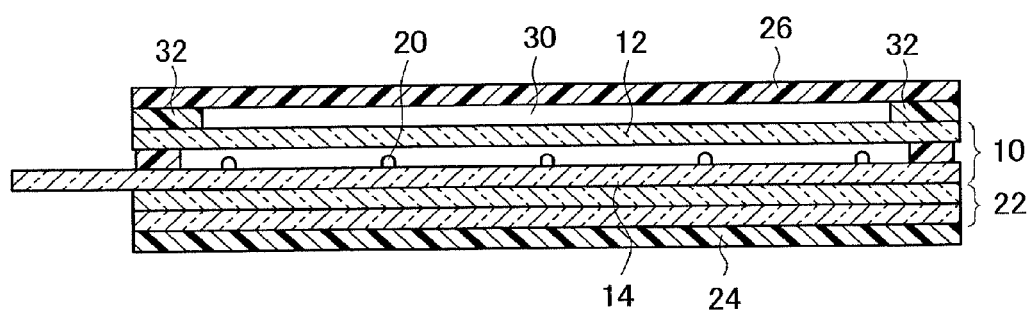
FIG. 4 is a cross-sectional view schematically showing a display device with a touch panel according to a modification 2 of the embodiment of the present invention.

FIG. 4 is a cross-sectional view schematically showing a display device with a touch panel according to a modification 2 of the embodiment of the present invention. In the modification 2, an air cushion layer 30 (that is, space) is formed between the touch panel 10 (first substrate 12) and the resin film 26. The first substrate 12 and the resin film 26 are arranged with a gap formed therebetween by way of a sealing material 32 so that the air cushion layer 30 is hermetically sealed. The sealing material 32 may have a cushion property. According to the modification 2, the user can enjoy smoother writing feeling due to the provision of the air cushion layer 30.

Figure 5:
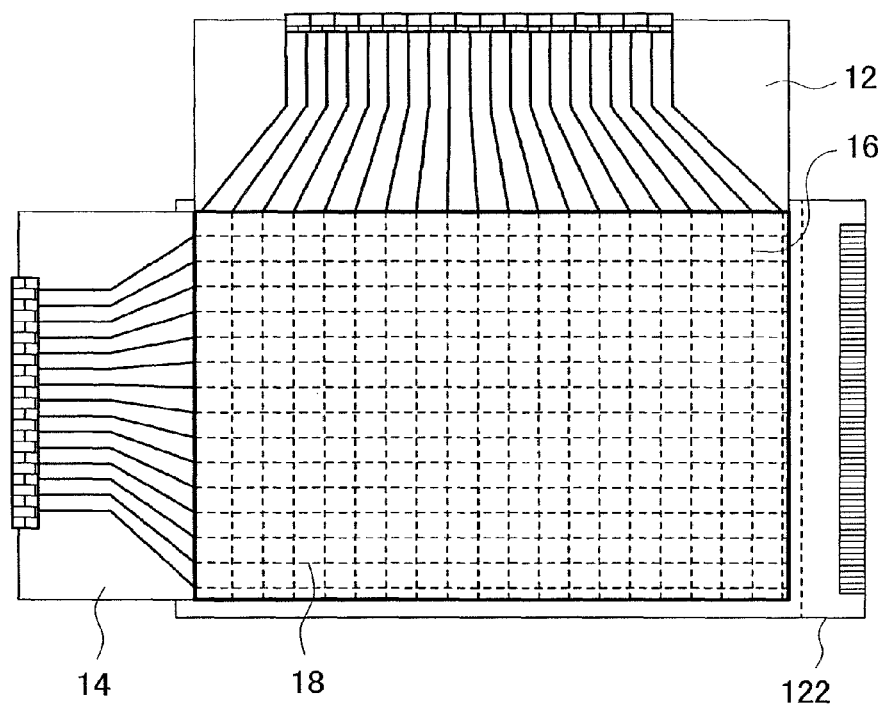
FIG. 5 is a plan view schematically showing a display device with a touch panel according to a modification 3 of the embodiment of the present invention.
Figure 6:
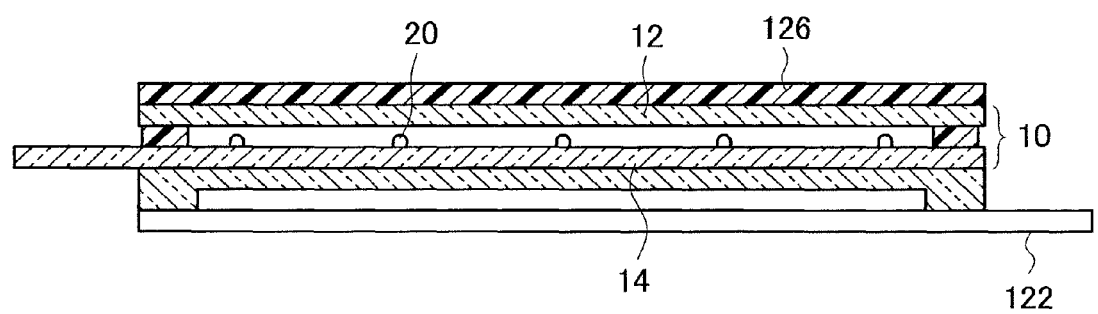
FIG. 6 is a cross-sectional view schematically showing the display device with a touch panel according to the modification 3 of the embodiment.

FIG. 5 is a plan view schematically showing a display device with a touch panel according to a modification 3 of the embodiment of the present invention. FIG. 6 is a cross-sectional view schematically showing the display device with a touch panel according to the modification 3 of the embodiment. Although a display panel 122 shown in FIG. 6 is an organic electroluminescence display panel (hereinafter, referred to as an "organic EL display panel"), the display panel 122 may be a field emission display panel. The touch panel 10 is adhered to a display screen of the display panel 122, and a resin film 126 is adhered to the touch panel 10. The resin film 126 is a circular polarizing plate and hence, the resin film 126 can enhance the visibility by preventing the reflection of light.

Figure 7:
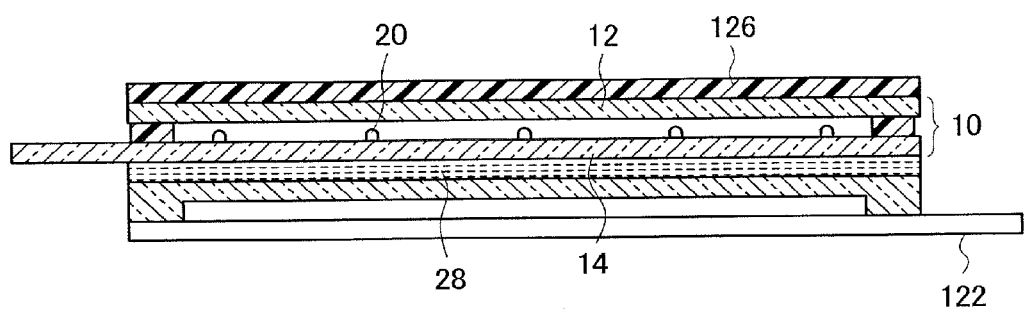
FIG. 7 is a cross-sectional view schematically showing a display device with a touch panel according to a modification 4 of the embodiment of the present invention.

FIG. 7 is a cross-sectional view schematically showing a display device with a touch panel according to a modification 4 of the embodiment of the present invention. Although the display panel 122 shown in FIG. 7 is an organic EL display panel, the display panel 122 may be a field emission display panel. In the modification 4, the cushion layer 28 is arranged between the display panel 122 and the touch panel 10 (second substrate 14). The cushion layer 28 is softer than the resin film 126. The cushion layer 28 is transparent. According to the modification 4, the feeling of unevenness that a user perceives is further alleviated by the cushion layer 28 arranged below the touch panel 10 so that the user can enjoy smooth writing feeling.

Here, a liquid crystal display panel may also be used as the display panel 122 shown in FIG. 7. In this case, in place of the organic EL display panel, a liquid crystal display panel to which the first polarizing plate 24 (see FIG. 3) is adhered on a side opposite to the cushion layer 28 is disposed, and the second polarizing plate is used as the resin film 126.

Figure 8:
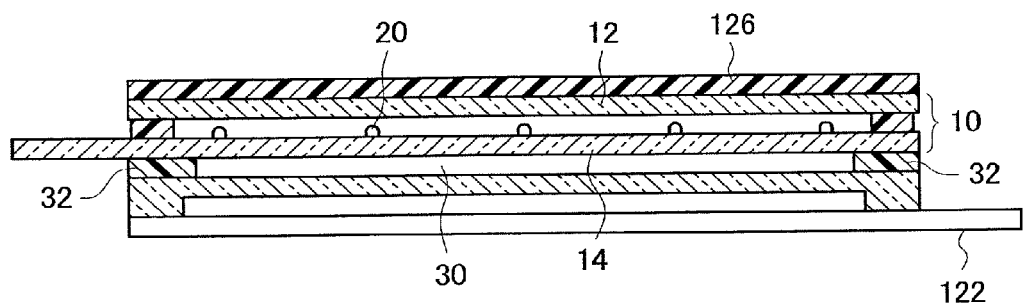
FIG. 8 is a cross-sectional view schematically showing a display device with a touch panel according to a modification 5 of the embodiment of the present invention.

FIG. 8 is a cross-sectional view schematically showing a display device with a touch panel according to a modification 5 of the embodiment of the present invention. Although the display panel 122 shown in FIG. 8 is an organic EL display panel, the display panel 122 may be a field emission display panel. In the modification 5, the air cushion layer 30 (that is, space) is formed between the touch panel 10 (second substrate 14) and the display panel 122. The second substrate 14 and the display panel 122 are arranged with a gap formed therebetween by way of the sealing material 32 so that the air cushion layer 30 is hermetically sealed. The sealing material 32 may have a cushion property. According to the modification 5, the feeling of unevenness which a user perceives is further alleviated by the air cushion layer 30 arranged below the touch panel 10 so that the user can enjoy the smooth writing feeling.

Here, a liquid crystal display panel may also be used as the display panel 122 shown in FIG. 8. In this case, in place of the organic EL display panel, a liquid crystal display panel to which the first polarizing plate 24 (see FIG. 4) is adhered on a side opposite to the air cushion layer 30 is disposed, and the second polarizing plate is used as the resin film 126.

[Touch Panel]

The touch panel of present invention may combine with a touch panel described in the specification and drawings of Japanese Patent Application 2007-149884. The content of the touch panel is explained hereinafter.

[Wiring Layout Mode 1]

Figure 9:
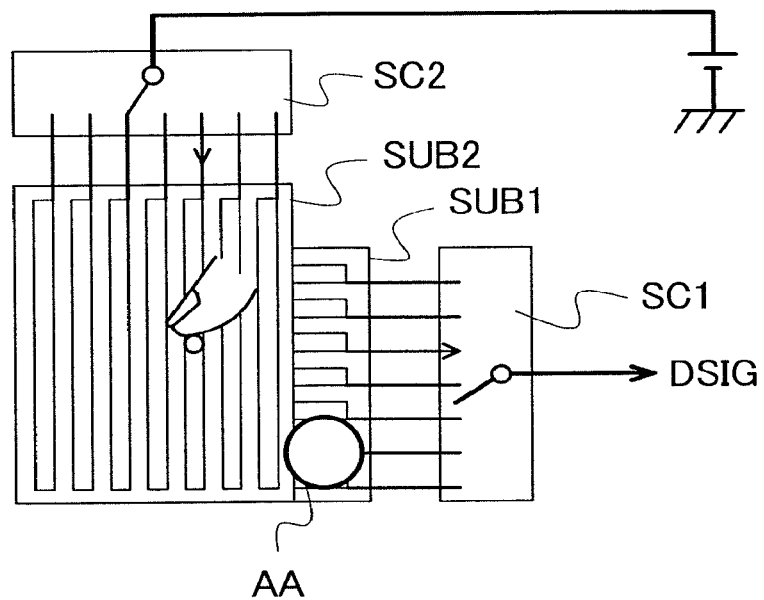
FIG. 9 is a schematic plan view of the touch panel.

FIG. 9 is a schematic plan view of the touch panel of this mode which adopts the touch panel described in the specification and drawings of Japanese Patent Application 2007-149884. The touch panel of this embodiment includes: a first substrate SUB1 and a second substrate SUB2 which are resin films made of polyethylene terephthalate (PET); a first peripheral circuit SC1; a second peripheral circuit SC2; a power source; and a detection signal output terminal.

The first substrate SUB1 and the second substrate SUB2 are flexible printed circuit boards formed as follows. That is, a PET film and a copper foil having a film thickness reduced to 10 µm or less by a cold rolling process are adhered to each other using a decorative steel sheet technique. Thereafter, using an etching technique in which an etchant is ejected at high temperature and high pressure, metal is processed into stripe-shaped metal lines (wiring) (a first electrode and a second electrode) each having a taper angle of 80 degrees to 90 degrees respectively. The first substrate SUB1 and the second substrate SUB2 are arranged so that their respective metal lines face each other in an opposed manner and that the extending direction of the metal lines on the first substrate SUB1 and extending direction of the metal lines on the second substrate SUB2 intersect with each other.

The first peripheral circuit SC1 is connected to the first substrate SUB1, and sequentially selects the metal lines by line so as to sequentially input a voltage to these lines from the power supply. The second peripheral circuit SC2 is connected to the second substrate SUB2, and sequentially selects the metal lines by line so as to sequentially detect a voltage to these lines from the power supply.

Figure 10:
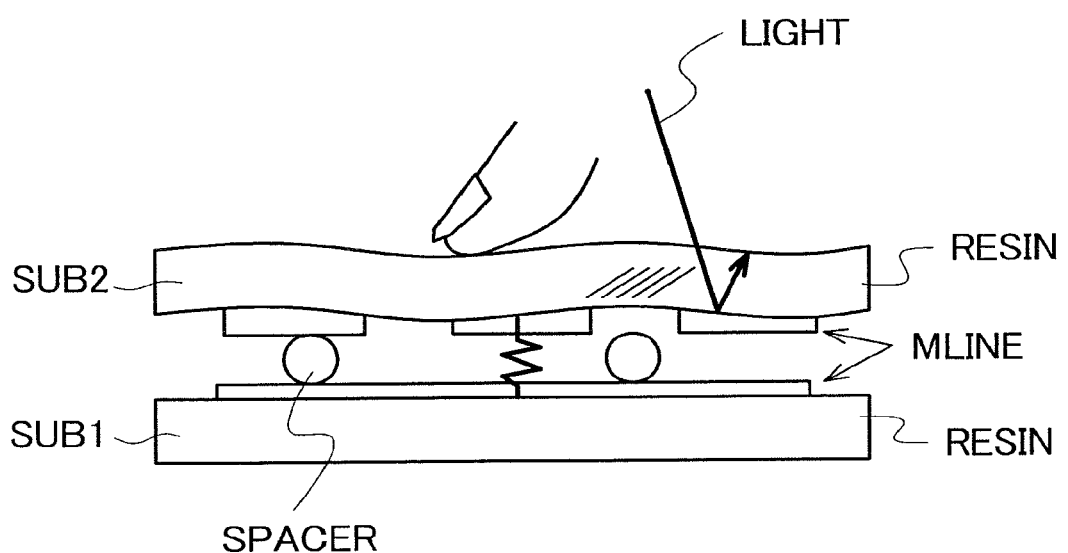
FIG. 10 is a cross-sectional view of the touch panel.

FIG. 10 is a cross-sectional view of a touch panel of this embodiment. The touch panel includes the first substrate SUB1, the second substrate SUB2 and spacers SPACER. The second substrate SUB2 is fixed to the first substrate SUB1 using a sealing material not shown in the drawing by way of the spacers SPACER.

Figure 11:
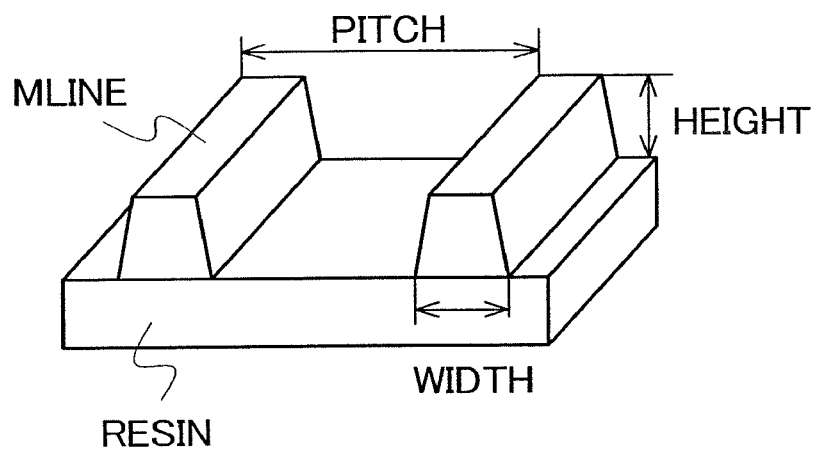
FIG. 11 is an enlarged cross-sectional view of a second substrate SUB2 within an AA region in FIG. 9.

FIG. 11 is an enlarged cross-sectional view of the second substrate SUB2 within an AA region in FIG. 9. As described previously, metal lines MLINE are arranged on the polyethylene terephthalate (PET) film.

According to this embodiment of the present invention, by adhering resin films provided with metal lines to each other by way of the spacers, the basic recognition structure can be realized, thus making it possible to manufacture an inexpensive touch panel which allows high-speed multipoint inputting and exhibits high durability. Further, a bright display can be realized by reducing a width of the metal line into less than 50% of the wiring pitch of the metal lines.

By providing the spacers in the gap, it is possible to ensure a uniform gap between the substrates SUB1, SUB2. Further, a maximum width of a planar shape of the spacer as viewed from the substrate direction is set larger than the wiring pitch of the metal lines. Accordingly, it is possible to prevent short-circuiting between the metal lines which face each other in an opposed manner attributed to the deformation of the resin film substrate, and it is also possible to suppress erroneous recognition of the touch panel. Further, a maximum width of a planar shape of the spacer as viewed from the substrate direction is set larger than the wiring pitch of the metal lines and hence, a possibility of short-circuiting can be reduced. Further, different from lines made of ITO, the metal lines do not allow light to pass therethrough. Accordingly, the width of the metal line is set to less than 50% of the wiring pitch of the metal wiring so as to prevent the reduction of transmissivity. By setting the wiring width to 13 to 20 µm, an inexpensive photo mask is available. The metal line is formed of an opaque metal film and can be made of carbon (C), nonferrous metal such as copper (Cu), stainless steel (SUS) or iron (Fe) besides aluminum (Al). As the resin used for forming the first substrate SUB1 and the second substrate SUB2, it is possible to use triacetyl cellulose (TAC) besides polyethylene terephthalate (PET). Other materials may be also used provided that a film made of such materials exhibits low birefringence in the same manner as the above-mentioned materials.

According to the embodiment of the present invention, a fine wiring pattern made of metal can sufficiently achieve the high definition of 300 lpi (line per inch). That is, the wiring pattern of this embodiment can increase the resolution thereof ten times or more compared to the resolution of a conventional example which is approximately 10 ppi (point per inch). In addition, the fine metal wiring pattern can be manufactured even when the metal line has a width of 10 µm and a thickness of approximately 10 µm. Therefore, by designing the fine wiring pattern such that the resolution of approximately 100 lpi is obtained, it is possible to improve the transmissivity of the resist-film-type touch panel compared to transmissivity of the conventional resist-film-type touch panel.

Although there may be a problem in terms of cost, the metal wiring can be manufactured not only by etching but also by precipitation, plating or the like.

To set forth the advantageous effects brought about by this embodiment of the present invention, they are as follows.

(1) With the use of the metal lines or metal wiring which are subject to addressing, a plurality of points can be detected simultaneously.

(2) Due to the advantageous effects set forth in (1), the detection can be performed by a digital circuit leading to the reduction of cost.

(3) Patterning of the transparent electrode becomes unnecessary leading to the reduction of cost.

(4) The metal wiring pattern and the flexible cable pattern can be formed simultaneously leading to the reduction of cost and the enhancement of reliability.

(5) The metal lines exhibits low resistance and hence, it is possible to increase a size of the touch panel to 40 inches or more (diagonally 1 meter or more) thus expanding an application of the display device with a touch panel to an area where mounting of a touch panel on a display device is difficult conventionally.

(6) It is sufficiently possible for the metal wiring to have a definition of 300 lpi or more and hence, the resolution can be increased 10 times or more compared to the current resolution of approximately 10 ppi.

(7) By using the above-mentioned high resolution and function of detecting a plurality of points simultaneously, it is possible to distinguish the difference in an object to be inputted to the touch panel or a method for inputting an object to the touch panel. For example, the difference between a stylus and a finger can be distinguished based on the difference in the number of detection points.

(8) By changing the color of the above-mentioned metal lines into black, it is possible to increase a contrast of a display such as a liquid crystal display on which a touch panel is mounted.

(9) The coordinate detection is performed using the metal lines (each line having a thickness of 10 µm) and hence, the reliability in lifetime such as the number of detection times is increased 10 times or more compared to the conventional transparent electrode (having a thickness of several hundred nm).

(10) The metal lines exhibit low resistance and hence, the detection can be performed digitally. Accordingly, this embodiment can realize a high-speed and high-definition detection whose detection speed and detection accuracy are approximately 100 times or more higher than corresponding detection speed and detection accuracy of a conventional analog detection mechanism adopting a resistive film system.

[Wiring Layout Mode 2]

Figure 12:
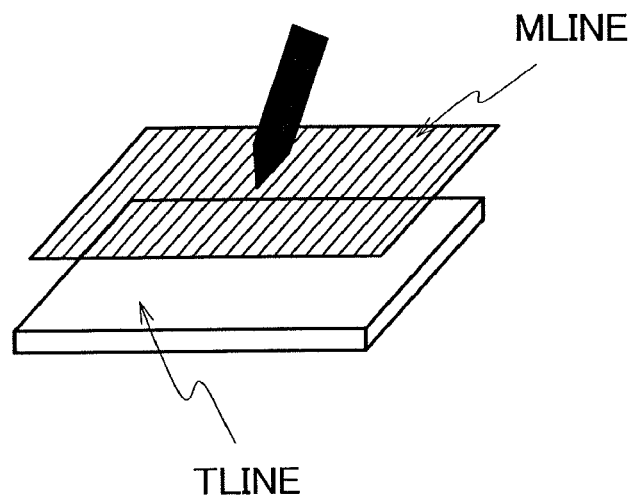
FIG. 12 is a perspective view of the touch panel according to the embodiment of the present invention.

FIG. 12 is a perspective view of another touch panel according to this mode. The wiring layout mode 2 is a modification of wiring layout mode 1. In this mode, wirings for detection which face each other in an opposed manner are changed in structure. FIG. 12 differs from FIG. 9 in that a transparent electrode made of ITO is used as the wiring arranged on the first substrate SUB1, and the ITO covers a whole surface of a detection area. By using this mode, it is possible to realize the enhancement of reliability, the increase of a detection speed, and a simple multipoint detection mechanism.

[Wiring Layout Mode 3]

Figure 13:
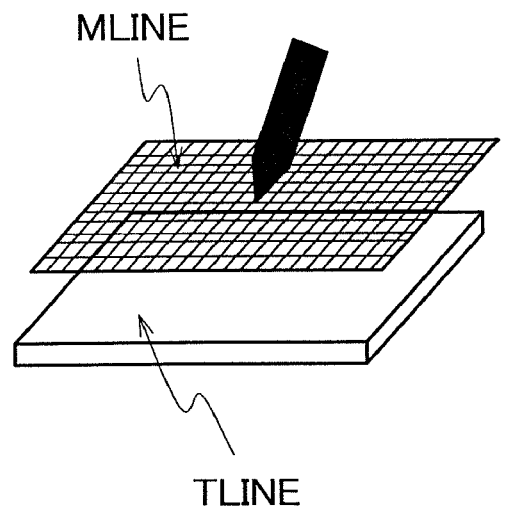
FIG. 13 is a perspective view of the touch panel according to the embodiment of the present invention.

FIG. 13 is a perspective view of another touch panel according to this mode. The wiring layout mode 3 of this mode is a modification of the wiring layout mode 1. In this mode, wirings for detection which face each other in an opposed manner are changed in structure. FIG. 13 differs from FIG. 12 in that the wiring arranged on the second substrate SUB2 is formed of a mesh of metal lines. By forming the metal wiring pattern as the mesh (lattice), the touch panel can be formed as a substitute for the resistance film. Accordingly, this mode can mainly contribute to the increase of the detection speed and the enhancement of reliability. In addition, by using two-dimensional patterning, the multipoint detection mechanism can be realized with a high speed and high accuracy even in combination with a conventional transparent electrode system. Further, although there may be a problem in terms of cost, a system which overcoats a fine metal pattern section with a transparent electrode is effective to realize large-sizing of a display device.

[Wiring Layout Mode 4]

Figure 14:
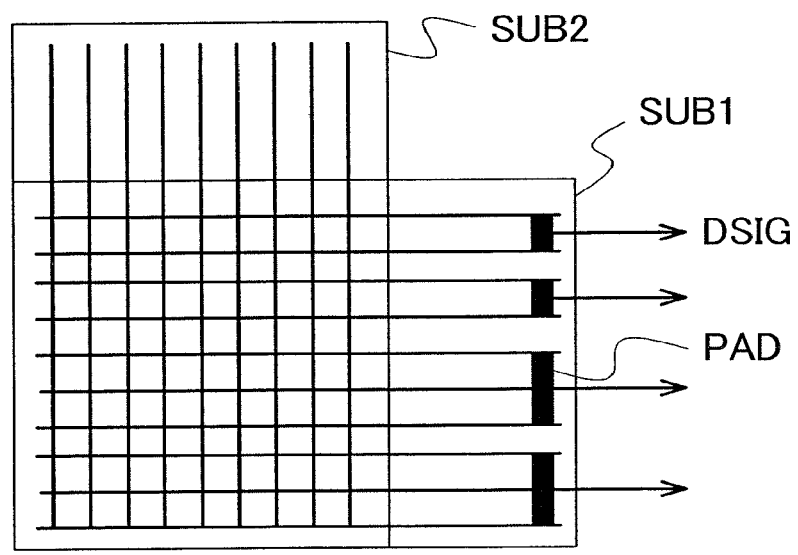
FIG. 14 is a schematic plan view of the touch panel.

FIG. 14 is a schematic plan view of a touch panel according to a modification of this mode. FIG. 14 differs from FIG. 9 in that a terminal PAD for combining a plurality of metal lines MLINE is provided in order to detect voltages of the plurality of metal lines MLINE simultaneously, and a detection signal is outputted from each terminal PAD. When the coordinate detection of high accuracy is unnecessary, the plurality of metal lines MLINE are combined so as to enhance a recognition rate. This mode is applicable to the stripe-shaped metal wiring in the wiring layout modes 1 and 2.

[Wiring Layout Mode 5]

Figure 15:
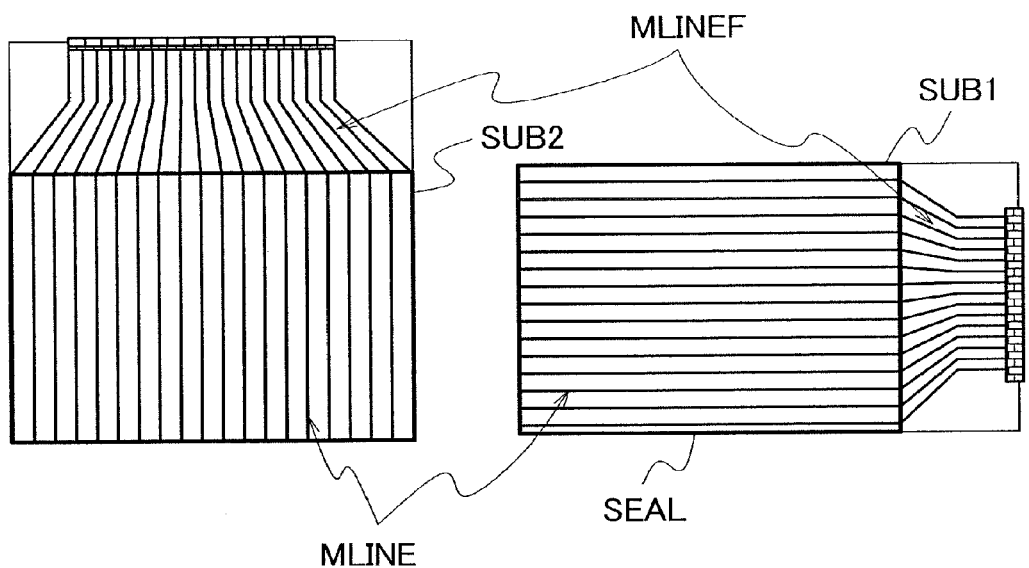
FIG. 15 is a schematic plan view of the touch panel.

FIG. 15 is a schematic plan view of a touch panel according to a modification of this mode. FIG. 15 differs from FIG. 9 in that the plurality of metal lines MLINE are made to extend up to external terminals formed on a resin while gradually decreasing a wiring pitch outside a detection area. In other words, without forming the external terminals and lines MLINE-F extending up to the external terminals on a substrate different from the base film, the external terminals and lines MLINE-F are formed on the same base film on which the plurality of metal lines MLINE are formed. This mode is applicable to the stripe-shaped metal wiring in the wiring layout modes 1 to 4. By adopting the wiring layout modes 1 to 4 in this manner, it is possible to simultaneously form the metal pattern and the flexible cable pattern for connection with circuits. A touch panel section and flexible cables are formed on the integral continuous resin thus realizing the reduction of the number of parts, the enhancement of reliability in connection, and the reduction of cost.

[Wiring Layout Mode 6]

Figure 16:
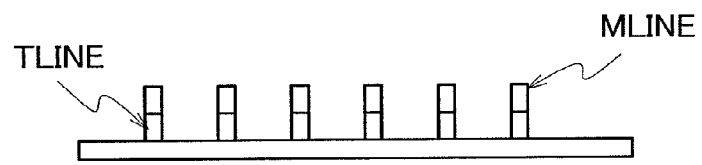
FIG. 16 is a cross-sectional view of a substrate which constitutes the touch panel.

FIG. 16 is a cross-sectional view of a substrate constituting a touch panel according to a modification of this mode. FIG. 16 differs from FIG. 11 in that stripe-shaped transparent lines TLINE having the same pattern as the pattern of the metal lines MLINE are arranged under the metal lines MLINE. This mode is applicable to the stripe-shaped metal wiring in the wiring layout modes 1 to 5.

[Wiring Layout Mode 7]

Figure 17:
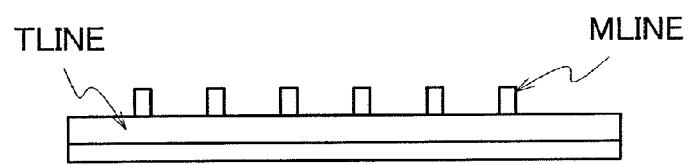
FIG. 17 is a cross-sectional view of a substrate which constitutes the touch panel.

FIG. 17 is a cross-sectional view of a substrate constituting a touch panel according to a modification of this mode. FIG. 17 differs from FIG. 11 in that the transparent wiring (electrode) TLINE which covers a whole surface of a detection area is arranged under the metal lines MLINE. This mode is applicable to the stripe-shaped metal wiring in the wiring layout modes 1 to 5.

[Wiring Layout Mode 8]

Figure 18:
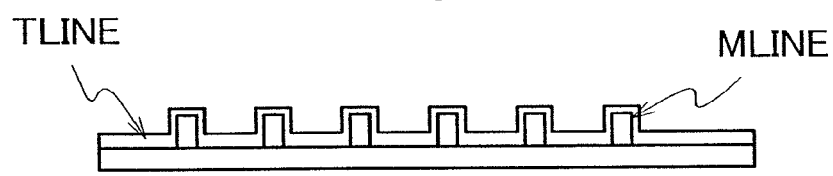
FIG. 18 is a cross-sectional view of a substrate which constitutes the touch panel.

FIG. 18 is a cross-sectional view of a substrate constituting a touch panel according to a modification of this mode. FIG. 18 differs from FIG. 11 in that the transparent wiring (electrode) TLINE which covers a whole surface of a detection area is arranged above the metal lines MLINE. This mode is applicable to the stripe-shaped metal wiring in the wiring layout modes 1 to 5.

[Wiring Layout Mode 9]

Figure 19:
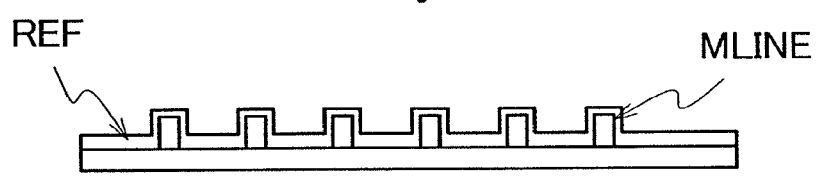
FIG. 19 is a cross-sectional view of a substrate which constitutes the touch panel.
Figure 20:
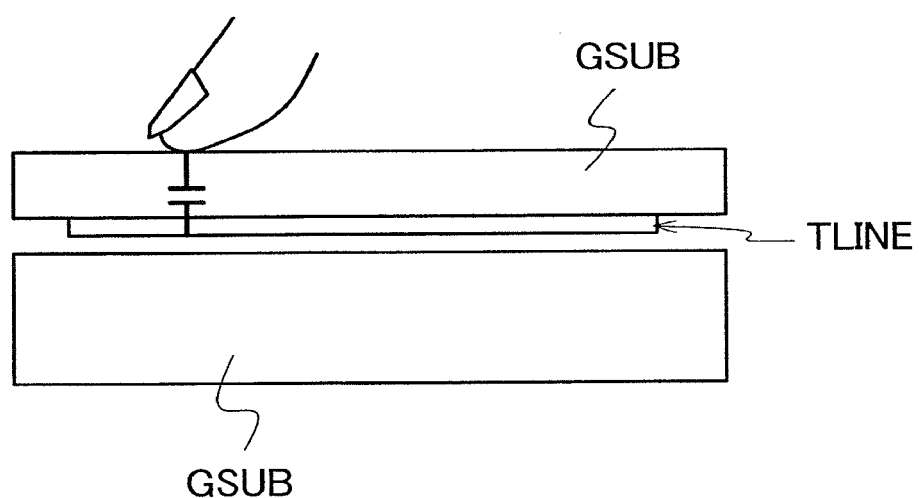
FIG. 20 is a view for explaining the principle of a conventional capacity-type touch panel.
Figure 21:
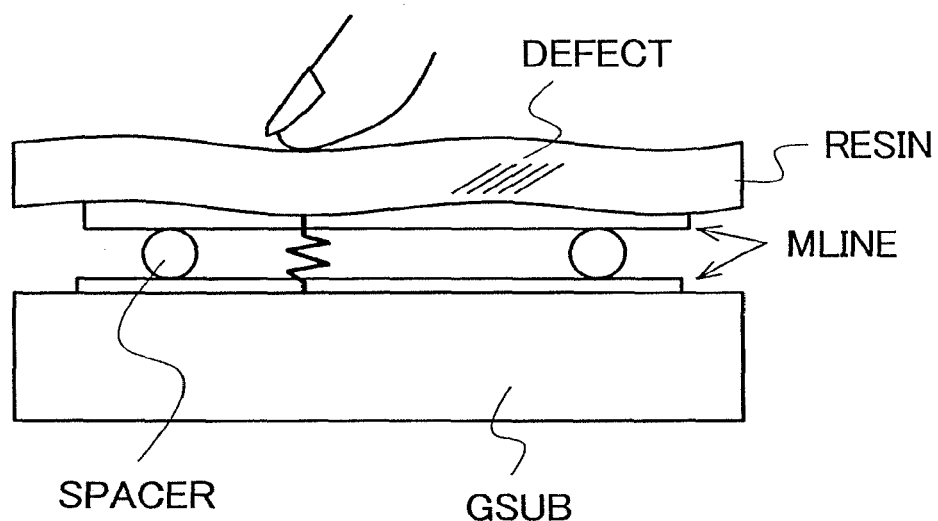
FIG. 21 is a view for explaining the principle of a conventional resistance-film-type touch panel.

FIG. 19 is a cross-sectional view of a substrate constituting a touch panel according to a modification of this mode. FIG. 19 differs from FIG. 11 in that an inner-surface reflection preventive film REF made of a $SiO_2$ thin film which covers a whole surface of a detection area is arranged under the metal lines MLINE. This mode is applicable to the stripe-shaped metal wiring in the wiring layout modes 1 to 5. A conventional touch panel uses transparent electrodes thus pushing up a manufacturing cost. According to this mode, since the inner-surface reflection preventive film can be manufactured at a low cost, it is possible to manufacture a display device which satisfy both high display quality and a low manufacturing cost.

The present invention is not limited to the above-mentioned embodiment and modifications, and various other modifications are conceivable without departing from the gist of the present invention. For example, the constitution explained in the embodiment can be replaced with the constitution substantially equal to the above-mentioned constitution, the constitution which can achieve the same manner of operation and advantages as the above-mentioned constitution or the constitution which can achieve the same object as the above-mentioned constitution.

The invention claimed is:

1. A display device comprising:
an organic emitting display panel:
a predetermined layer arranged above the organic emitting display panel:
a touch panel, arranged above the predetermined layer:
first lines to detect a coordinate in a detection area; and
a circular polarizing plate, arranged above the touch panel, adhering to the touch panel, wherein
the lines include metal lines which overlap the predetermined layer,
the predetermined layer is softer than the circular polarizing plate,
a width of the metal lines is less than 50% of a wiring pitch of the metal lines,
the lines include ITO lines
the ITO lines overlap a region where the metal lines overlap the predetermined layer and
the circular polarizing plate;
the lines include outside lines arranged outside the detection area and a wiring pitch of the outside lines is narrower than a wiring pitch of the lines in the detection area.

2. A display device according to claim 1, further comprising a display panel, wherein at least a portion of the display panel does not overlap the circular polarizing plate in a plan view.

3. A display device according to claim 2, wherein the lines include first lines and second lines,
the touch panel includes a plurality of wiring groups,
each of the plurality of wiring groups has some of the first lines, and
some of the first lines in each of the plurality of wiring groups are banded in each other.

4. A display device according to claim 3, wherein each of the second lines and the first lines is made of metal, and each of the first lines is black in color.

5. A display device according to claim 4, wherein a transparent conductive film overlays the first lines, and wherein the transparent conductive film is electrically connected to the first lines.

6. A display device according to claim 4, wherein a transparent conductive film underlays the first lines, and wherein the transparent conductive film is electrically connected to the first lines.

7. A display device according to claim 3, wherein a transparent conductive film overlays the second lines, and wherein the transparent conductive film is electrically connected to the second lines.

8. A display device according to claim 3, wherein a transparent conductive film underlays the second lines, and wherein the transparent conductive film is electrically connected to the second lines.

9. A display device according to claim 2, wherein the touch panel is a resistance-film-type touch panel.

10. A display device according to claim 2, further comprising:
a first adhesive layer between the touch panel and the circular polarizing plate, wherein the touch panel and the organic emitting display panel are fixed in each other by the seal material,
wherein the touch panel and the circular polarizing plate are fixed in each other by the first adhesive layer.

11. A display device comprising:
an organic emitting display panel:
a predetermined layer arranged above the organic emitting display panel:
a touch panel, arranged above the predetermined layer:
lines to detect a coordinate in a detection area; and
a circular polarizing plate, arranged above the touch panel, adhering to the touch panel,
wherein the lines overlap the predetermined layer,
the predetermined layer is softer than the circular polarizing plate,
the lines include metal lines,
a width of the metal lines is less than 50% of a wiring pitch of the metal lines,
the lines include ITO lines
the ITO lines overlap a region where the metal lines overlap the predetermined layer and
the circular polarizing plate;
the lines include outside lines arranged outside the detection area and
a wiring pitch of the outside lines is narrower than a wiring pitch of the lines in the detection area.

* * * * *